(12) United States Patent
Du et al.

(10) Patent No.: US 10,528,811 B2
(45) Date of Patent: Jan. 7, 2020

(54) BUILDING FOOTPRINT EXTRACTION APPARATUS, METHOD AND COMPUTER PROGRAM PRODUCT

(71) Applicant: CORELOGIC SOLUTIONS, LLC, Irvine, CA (US)

(72) Inventors: Wei Du, Springfield, VA (US); Thomas C. Jeffery, Milton, WI (US); Howard Botts, Madison, WI (US)

(73) Assignee: CORELOGIC SOLUTIONS, LLC, Santa Ana, CA (US)

( * ) Notice: Subject to any disclaimer, the term of this patent is extended or adjusted under 35 U.S.C. 154(b) by 170 days.

(21) Appl. No.: 15/644,385

(22) Filed: Jul. 7, 2017

(65) Prior Publication Data

US 2017/0330032 A1 Nov. 16, 2017

Related U.S. Application Data

(63) Continuation of application No. 15/438,345, filed on Feb. 21, 2017, now abandoned, which is a continuation of application No. 13/243,405, filed on Sep. 23, 2011, now Pat. No. 9,639,757.

(51) Int. Cl.
*G06K 9/00* (2006.01)
*G06K 9/62* (2006.01)
*G06K 9/46* (2006.01)

(52) U.S. Cl.
CPC ....... *G06K 9/00637* (2013.01); *G06K 9/4661* (2013.01); *G06K 9/6215* (2013.01)

(58) Field of Classification Search
None
See application file for complete search history.

(56) References Cited

U.S. PATENT DOCUMENTS

| | | | |
|---|---|---|---|
| 5,935,210 | A | 8/1999 | Stark |
| 6,118,404 | A | 9/2000 | Fernekes et al. |
| 6,836,270 | B2 | 12/2004 | Du |

(Continued)

FOREIGN PATENT DOCUMENTS

| | | |
|---|---|---|
| GB | 2 457 215 A | 8/2009 |
| JP | 2008-243130 A | 10/2008 |

OTHER PUBLICATIONS

Office Action dated Sep. 26, 2012 in New Zealand Patent Application No. 602590.

(Continued)

*Primary Examiner* — Iman K Kholdebarin
(74) *Attorney, Agent, or Firm* — Xsensus LLP

(57) ABSTRACT

A system, method and computer program product cooperate to extract a building footprint from other data associated with a property. Imagery data of real property is input to a computing device, the imagery data containing a plurality of parcels. A processing circuit detects contrasts of candidate man-made structures on a parcel of the plurality of parcels. The candidate man-made structures are then associated with the parcel. A building footprint is then extracted by distinguishing a man-made structure on said parcel from natural terrain, recognizing that man-made structures when viewed from above generally show a strong contrast from background terrain. Remaining candidate man-made structures are removed by observing that they having features inconsistent with predetermined extraction logic.

14 Claims, 11 Drawing Sheets

(56) References Cited

U.S. PATENT DOCUMENTS

| | | | |
|---|---|---|---|
| 6,839,403 B1 | 1/2005 | Kotowski et al. | |
| 7,133,551 B2 | 11/2006 | Chen et al. | |
| 7,305,983 B1* | 12/2007 | Meder | G01W 1/12 126/621 |
| 7,324,666 B2 | 1/2008 | Zoken et al. | |
| 7,509,241 B2 | 3/2009 | Guo et al. | |
| 7,599,512 B2* | 10/2009 | Shimizu | G06K 9/46 382/100 |
| 7,650,047 B2* | 1/2010 | Jin | G06T 7/97 382/218 |
| 7,890,509 B1* | 2/2011 | Pearcy | G06Q 10/06 707/736 |
| 7,917,292 B1 | 3/2011 | Du | |
| 8,065,352 B2* | 11/2011 | Klein | G06Q 10/08 701/532 |
| 8,259,993 B2* | 9/2012 | Sasakawa | G01C 11/04 382/100 |
| 8,284,190 B2* | 10/2012 | Muktinutalapati | G06T 7/33 345/419 |
| 8,422,825 B1 | 4/2013 | Neophytou et al. | |
| 8,488,845 B1* | 7/2013 | Tang | G06K 9/00651 382/113 |
| 8,628,088 B2* | 1/2014 | Sakdinan | A63F 9/1288 273/157 R |
| 8,649,567 B1 | 2/2014 | Maltby, II | |
| 2003/0011599 A1* | 1/2003 | Du | G06T 17/05 345/428 |
| 2004/0260510 A1* | 12/2004 | Du | G06Q 10/06 702/179 |
| 2004/0263514 A1* | 12/2004 | Jin | G06K 9/0063 345/440 |
| 2005/0034074 A1 | 2/2005 | Munson et al. | |
| 2005/0209781 A1* | 9/2005 | Anderson | G06T 17/05 702/5 |
| 2005/0259847 A1 | 11/2005 | Genc et al. | |
| 2006/0262963 A1 | 11/2006 | Navulur et al. | |
| 2008/0319655 A1* | 12/2008 | Vande Velde | G01C 21/32 701/532 |
| 2009/0043504 A1* | 2/2009 | Bandyopadhyay | G01C 17/38 701/469 |
| 2009/0110267 A1* | 4/2009 | Zakhor | G06T 15/04 382/154 |
| 2010/0128977 A1* | 5/2010 | Yagyuu | G06T 7/254 382/165 |
| 2011/0033110 A1* | 2/2011 | Shimamura | G01C 11/06 382/173 |
| 2011/0075882 A1 | 3/2011 | Guo et al. | |
| 2011/0310087 A1* | 12/2011 | Wright, Jr. | G06T 13/80 345/419 |
| 2012/0041722 A1* | 2/2012 | Quan | G06T 17/05 703/1 |
| 2012/0050525 A1* | 3/2012 | Rinner | G06T 7/33 348/117 |
| 2012/0078956 A1 | 3/2012 | Klein | |
| 2012/0114249 A1 | 5/2012 | Conwell | |
| 2012/0259550 A1 | 10/2012 | Du | |
| 2012/0314935 A1* | 12/2012 | Cheng | G06K 9/00671 382/154 |
| 2013/0077819 A1 | 3/2013 | Du et al. | |
| 2013/0202197 A1 | 8/2013 | Reeler | |
| 2013/0208996 A1* | 8/2013 | Schultz | G06T 3/4038 382/284 |
| 2014/0125671 A1* | 5/2014 | Vorobyov | G01C 11/00 345/427 |

OTHER PUBLICATIONS

New Zealand Further Examination Report dated Mar. 14, 2013, in Application No. 602590.

Notice of Acceptance dated Jul. 12, 2013, in Patent Application No. 602590.

Australian Patent Examination Report dated Mar. 2, 2016 in Application No. 2012227223.

* cited by examiner

BUILDING FOOTPRINT EXTRACTION APPARATUS, METHOD AND COMPUTER PROGRAM PRODUCT

CROSS-REFERENCE TO RELATED APPLICATIONS

This application is a continuation of and claims the benefit of 35 U.S.C. § 120 from U.S. Ser. No. 15/438,345, filed Feb. 21, 2017, which is a continuation of U.S. Ser. No. 13/243,405, filed Sep. 23, 2011, the entire contents of each of which are incorporated herein by reference.

BACKGROUND

Technical Field

The present description relates to systems, methods and computer program product regarding techniques for extracting building footprints for multiple properties included in a common media, such as an image.

Description of the Related Art

As recognized by the present inventors, the accuracy of hazard risk assessment is highly dependent on the ability to precisely identify locations of building structures within particular parcels. Theoretically, the primary focus of such risk assessment is not the total land area of the properties, but the specific structures (improvements) that would incur damage from natural disasters. Street segment interpolation-based geocoding technology has been used to provide the locations of property based on the distance extrapolation using the address ranges along street line segments. However, street line segments and properties are in different geospatial entities with different design targets and objectives. Since properties are not evenly distributed along street line segments, often, the geocodes from the street segment based geocoding technology do not accurately identify the physical location of the properties. The present assignee has progressively developed parcel based geocoding technology that more accurately identifies the location of land associated with the properties. The parcel based geocoding technology has significantly increased geocoding accuracy in comparison to street segment extrapolation.

However, as recognized by the present inventors, even with the enhanced accuracy of parcel based geocoding, using the parcel centroid of a property for assessing flood risk for structures on that property, in some instances, may need further adjustment in order to provide quality hazard risk analysis. On a small residential lot there is a high likelihood that the parcel centroid will coincide with the structure, thereby placing the geocode location precisely on the residence. However, for larger properties, including commercial parcels that occupy multiple acres, the parcel centroid may not coincide with the structures.

SUMMARY

In view of the limitations with conventional systems, the present inventors identified a parcel based building footprint auto-extraction methodology, using either aerial photos or satellite imagery.

A system, method and computer program product, cooperate to allow for the inputting of imagery data of land that contains the plurality of parcels. One non-limiting example of the imagery data may be an aerial photograph of a particular land region. The land region would include multiple parcels, and in some cases a boundary overlay, distinguishing one parcel from the next may be applied to different parcels. Then, a processing circuit is used to detect image contrasts between natural terrains and potential man-made structures on a particular parcel. Moreover, as recognized by the present inventors, if imagery data is exposed to enhanced image contrast, natural terrain becomes distinguishable from potential man-made structures. For example, a roof of a building may appear to be a uniform coloration, as compared to a canopy of trees that outline the lawn that surrounds the building. Then, the potential man-made structures are associated with the parcel in one of a variety of ways, including by parcel identification such as address, by latitude/longitude, or by database identifiers so that a common set of data for a particular parcel is saved in a database that is retrieved on a parcel by parcel basis. Then, the building footprint of the detected man-made structures may be extracted. This extracting includes filtering out remaining potential man-made structures having features that are inconsistent with predetermined extraction rules.

The foregoing paragraphs have been provided by way of general introduction, and are not intended to limit the scope of the following claims. The described embodiments, together with the further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The following describes various aspects of a system and method that uses computer resources to collect process and store parcel data including footprints of buildings associated with the buildings.

Figure 1:
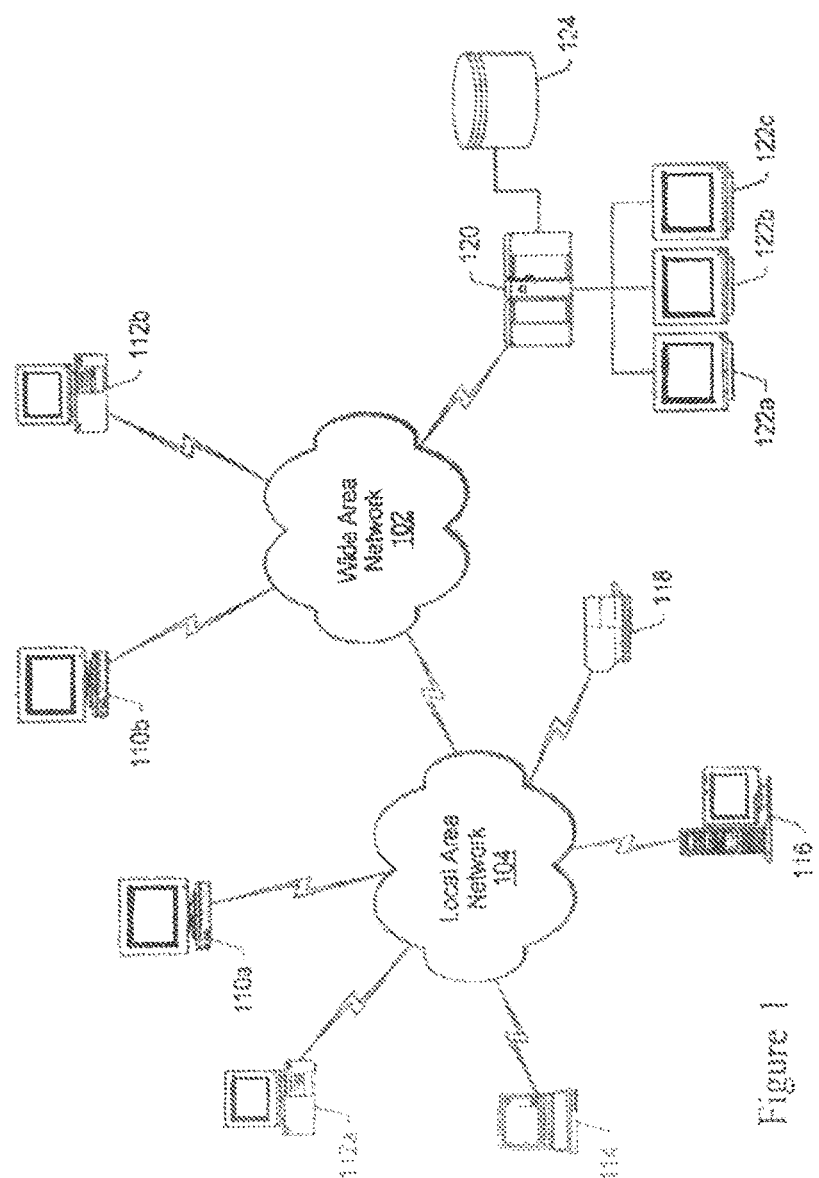
FIG. 1 is a computer based system and network that may be employed for information exchange, processing capability and analysis, according to one embodiment.

FIG. 1 illustrates an embodiment of a WAN 102 and a LAN 104. WAN 102 may be a network that spans a relatively large geographical area, and may optionally include cloud computing resources that host applications, and/or provide computing and storage resources as needed to supplement the processes and resources discussed herein. The Internet is an example of a WAN 102. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more LANs 104 maybe coupled to WAN 102. LAN 104 may be a network that spans a relatively small area. Typically, LAN 104 may be confined to a single building or group of buildings. Each node (i.e., individual computer system or device) on LAN 104 may have its own CPU with which it may execute programs. Each node may also be able to access data and devices anywhere on LAN 104. LAN 104, thus, may allow many users to share devices (e.g., printers) and data stored on file servers. LAN 104 may be characterized by a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, and/or radio waves).

Each LAN 104 may include a plurality of interconnected computer systems and optionally one or more other devices. For example, LAN 104 may include one or more workstations 110a, one or more personal computers 112a, one or more laptop or notebook computer systems 114, one or more server computer systems 116, and one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs through WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data stored in the storage device or file server 124 coupled to or included in mainframe computer system 120.

WAN 102 may also include computer systems connected to WAN 102 individually and not through LAN 104. For example, workstation 110b and personal computer 112b may be connected to WAN 102. For example, WAN 102 may include computer systems that may be geographically remote and connected to each other through the Internet.

Figure 2:
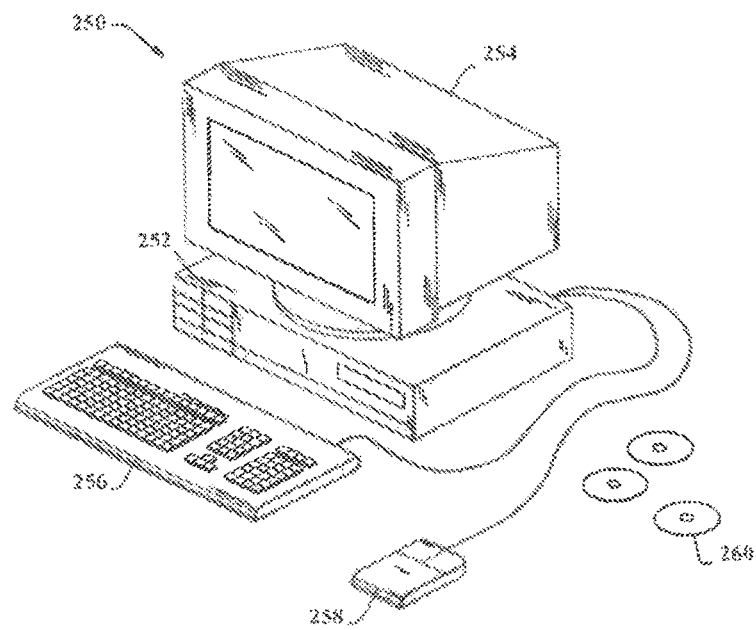
FIG. 2 is a computer system that may be suitable for implementing various embodiments of a system and method for extracting building footprints according to the embodiment.

FIG. 2 illustrates an embodiment of computer system 250 that may be suitable for implementing various embodiments of a system and method for flood risk assessment. Each computer system 250 typically includes components such as CPU 252 with an associated memory medium such as CD-ROMs 260. The memory medium may store program instructions for computer programs. The program instructions may be executable by CPU 252. Computer system 250 may further include a display device such as monitor 254, an alphanumeric input device such as keyboard 256, and a directional input device such as mouse 258. Computer system 250 may be operable to execute the computer programs to implement computer-implemented systems and methods for flood risk assessment.

Computer system 250 may include a memory medium on which computer programs according to various embodiments may be stored. The term "memory medium" is intended to include an installation medium, e.g., floppy disks or CDROMs 260, a computer system memory such as DRAM, SRAM, EDO RAM, Rambus RAM, etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. Computer system 250 may take various forms such as a personal computer system, tablet computer, smartphone (e.g., IPHONE, with associated APPS), mainframe computer system, workstation, network appliance, Internet appliance, personal digital assistant ("PDA"), television system or other device. In general, the term "computer system" may refer to any device having a processing circuit that executes instructions from a memory medium (non-transitory computer readable storage device).

The memory medium may store a software program, such as an APP, or programs operable to implement a method for flood risk assessment. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes ("MFC"), browser-based applications (e.g., Java applets), APPS like those available from APPLE COMPUTER's APP STORE, traditional programs, or other technologies or methodologies, as desired. A CPU such as host CPU 252 executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

Figure 3:
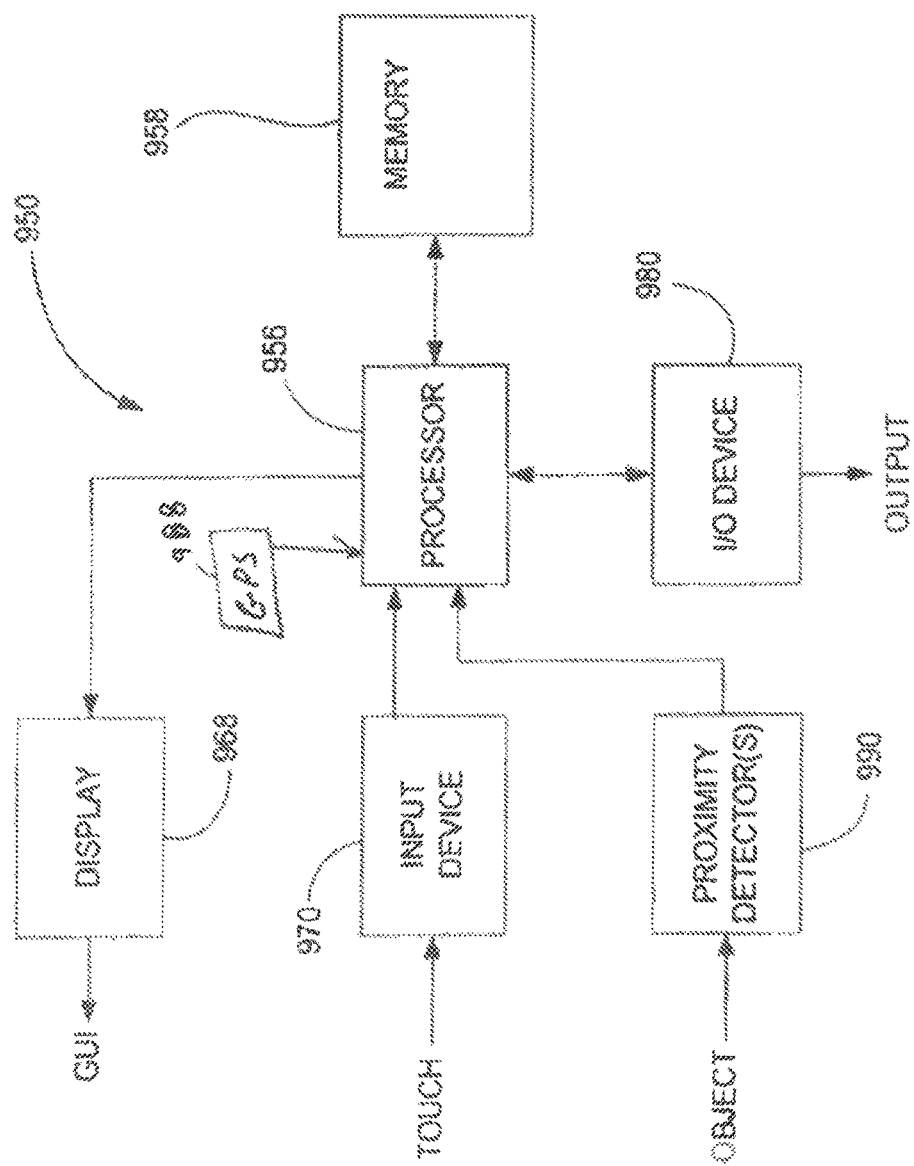
FIG. 3 is a block diagram of selected components of a computer of FIG. 2.

FIG. 3 is a block diagram of an exemplary computer system 950 that may be used as a specific computer resource for assisting in building footprint extraction as described herein. The computer system 950 may correspond to a personal computer, such as a desktop, laptop, tablet or handheld computer. The computer system may also correspond to other types of computing devices such as cell phones, PDAs, media players, consumer electronic devices, and/or the like.

The exemplary computer system 950 shown in FIG. 3 includes a processor 956 configured to execute instructions and to carry out operations associated with the computer system 950. For example, using instructions retrieved for example from memory, the processor 956 may control the reception and manipulation of input and output data between components of the computing system 950. The processor 956 can be implemented on a single-chip, multiple chips or multiple electrical components. For example, various architectures can be used for the processor 956, including dedicated or embedded processor, single purpose processor, controller, ASIC, and so forth.

In most cases, the processor 956 together with an operating system operates to execute computer code and produce and use data. By way of example, the operating system may correspond to Mac OS, OS/2, DOS, Unix, Linux, Palm OS, and the like. The operating system can also be a special purpose operating system, such as may be used for limited purpose appliance-type computing devices. The operating system, other computer code and data may reside within a memory block 958 that is operatively coupled to the processor 956. Memory block 958 generally provides a place to store computer code and data that are used by the computer system 950. By way of example, the memory block 958 may include Read-Only Memory (ROM), Random-Access Memory (RAM), hard disk drive and/or the like. The information could also reside on a removable storage medium and loaded or installed onto the computer system 950 when needed. Removable storage media include, for example, CD-ROM, PC-CARD, memory card, floppy disk, magnetic tape, and a network component.

The computer system 950 also includes a display device 968 that is operatively coupled to the processor 956. The display device 968 may be a liquid crystal display (LCD) (e.g., active matrix, passive matrix and the like) with a touchscreen capability. Alternatively, the display device 968 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks or OLEDs.

The display device 968 is generally configured to display a graphical user interface (GUI) that provides an easy to use interface between a user of the computer system and the operating system or application running thereon. Generally speaking, the GUI represents, programs, tiles and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith, By way of example, a user may select a button that opens, closes, minimizes, or maximizes a window, or an icon that launches a particular program. The GUI can additionally or alternatively display information, such as non interactive text and graphics, for the user on the display device 968.

The computer system 950 also includes an input device 970 that is operatively coupled to the processor 956. The input device 970 is configured to transfer data from the outside world into the computer system 950. The input device 970 may include a touch sensing device configured to receive input from a user's touch and to send this information to the processor 956. In many cases, the touch-sensing device recognizes touches, as well as the position and magnitude of touches on a touch sensitive surface. The touch sensing means reports the touches to the processor 956 and the processor 956 interprets the touches in accordance with its programming. For example, the processor 956 may initiate a task in accordance with a particular touch. A dedicated processor can be used to process touches locally and reduce demand for the main processor of the computer system. The touch sensing device may be based on sensing technologies including but not limited to capacitive sensing, resistive sensing, surface acoustic wave sensing, pressure sensing, optical sensing, and/or the like. Furthermore, the touch sensing means may be based on single point sensing or multipoint sensing. Single point sensing is capable of only distinguishing a single touch, while multipoint sensing is capable of distinguishing multiple touches that occur at the same time.

In the illustrated embodiment, the input device 970 is a touch screen that is positioned over or in front of the display 968. The touch screen, according to one embodiment (also the input device 970) may be integrated with the display device 968 or it may be a separate component. The touch screen has several advantages over other input technologies such as touchpads, mice, etc. For one, the is positioned in front of the display 968 and therefore the user can manipulate the GUI directly. For example, the user can simply place their finger over an object to be selected, activated, controlled, etc, in touch pads, there is no one-to-one relationship such as this. With touchpads, the touchpad is placed away from the display typically in a different plane. For example, the display is typically located in a vertical plane and the touchpad is typically located in a horizontal plane. This makes its use less intuitive, and therefore more difficult when compared to touch screens.

The can be a single point or multipoint touchscreen. Multipoint input devices have advantages over conventional single point devices in that they can distinguish more than one object (finger) simultaneously. Single point devices are simply incapable of distinguishing multiple objects at the same time.

The computer system 950 also includes a proximity detection system 990 that is operatively coupled to the processor 956. The proximity detection system 990 is configured to detect when a finger (or stylus) is in close proximity to (but not in contact with) some component of the computer system including for example housing or I/O devices such as the display and touch screen. The proximity detection system 990 may be widely varied. For example, it may be based on sensing technologies including capacitive, electric field, inductive, hall effect, reed, eddy current, magneto resistive, optical shadow, optical visual light, optical IR, optical color recognition, ultrasonic, acoustic emission, radar, heat, sonar, conductive or resistive and the like. A few of these technologies will now be briefly described.

The computer system 950 also includes capabilities for coupling to one or more I/o devices 980. By way of example, the I/O devices 980 may correspond to keyboards, printers, scanners, cameras, speakers, and/or the like. The I/O devices 980 may be integrated with the computer system 950 or they may be separate components (e.g., peripheral devices). In some cases, the I/O devices 980 may be connected to the computer system 950 through wired connections (e.g., cables/ports). In other cases, the I/O devices 980 may be connected to the computer system 950 through wireless connections. By way of example, the data link may correspond to PS/2, USB, IR, RF, Bluetooth or the like.

In addition, the computer system 950 includes a GPS module 988 that communicates with the processor 956. The GPS 988 not only collects position information (latitude, longitude, and elevation), but records this information at specific position points. For example, the position information is recorded when a user makes a position point recording request when investigating a particular property. The user may choose to record position points (sometimes referred to as property points) at the corners of the building on a parcel, or perhaps continuously records the position information as the user walks around the periphery of the building structure. Position information is then recorded in the memory 958, which may be stored locally if the application software is executed locally, or output through the I/O device 980 for processing at a remote site, such as through a dedicated server, or perhaps through a remote computer system such as in a cloud computing context.

Figure 4:
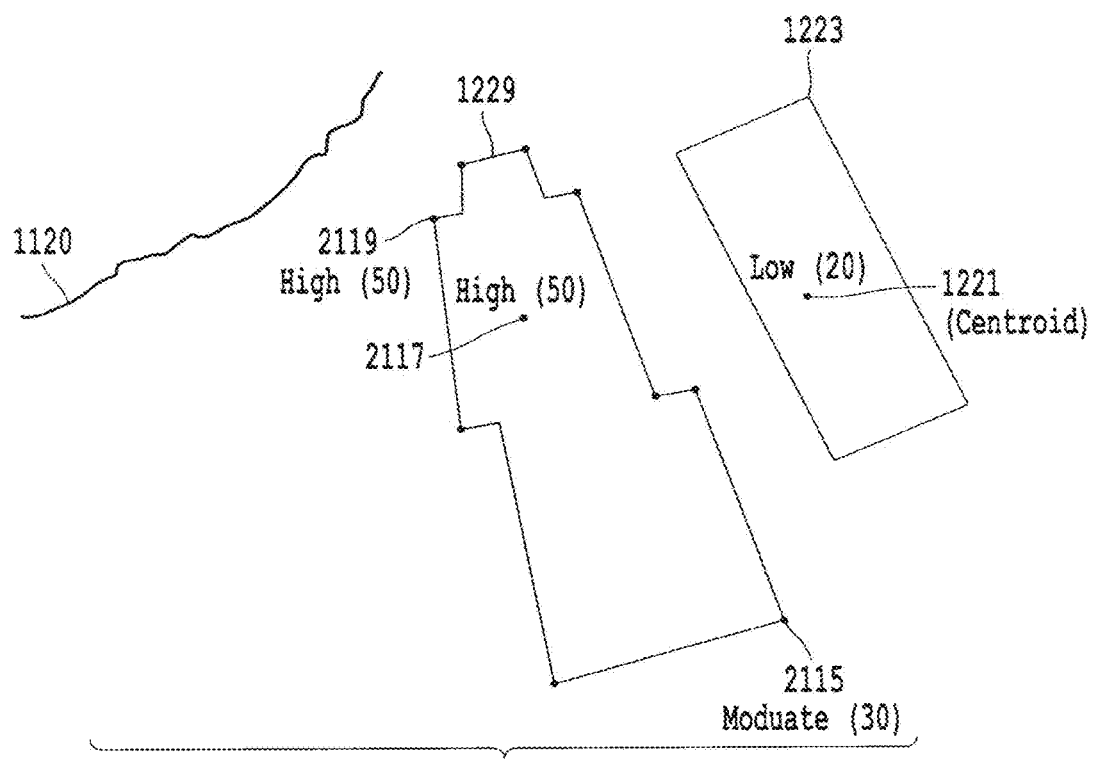
FIG. 4 is an exemplary aerial map of a building with various position points and associated flood risk scores for an exemplary property showing risk scores at boundary points of building footprint vs. risk score at parcel centroid.

FIG. 4 is an aerial view of an example property that includes a commercial building 1229 and parking lot 1223. One aspect of the present embodiment is that flood risk scores may be assigned to different property points within the parcel. For example, the centroid of the parcel (which may be available from national databases containing property boundary information) may be located in the middle of the parking lot 1221. The flood risk score at the centroid may very well be "low", having a flood risk score of 20, as shown if the position of the centroid is at a higher elevation, and not close to a potential flood source. Moreover, if a flood risk score (FRS) is assigned only to the parcel centroid, that score may not give a valuable assessment of the potential flood risk to the large commercial building 1229. Rather than the centroid, it will often be better to have a FRS at one or more property points at or on the improvements (e.g., buildings) on the property. U.S. patent application Ser. No. 12/027,096 describes FRS calculation procedures, and the entire contents of this application is incorporated herein by reference.

In FIG. 4, position point 2117 is on top of the building and position point 2119 is located at the corner of the building, but both have "high" FRS's (shown as "50") since they are at a lower elevation than the centroid 1221 and are closer to the flood hazard 1130 (which may be a pond or a stream for example). Position point 2115, which might be slightly higher and at a different portion of the building, has a moderate FRS, 30 in this case. Once again this is due in part to an elevation increase relative to position points 2117 and 2119 and further distance from the floor source.

Multiple position points for a single building may be relevant if, for example, a large commercial building has more valuable property located at position point 2115 than at portions of the building 2117 or 2119. As such, appropriate insurance rates may be lower if portions of the building structure, or even multiple buildings themselves, are tracked on a point-by-point basis, each point having a FRS assigned to it. By making multiple FRS points per parcel, the granularity with which a true assessment of particular improvements on a property, may be better tracked, with better financial risk analysis made possible.

Although only three position points are assigned to the building 1229, it would be reasonable to assign position points to each corner of the building, each having a separate FRS. Likewise, the building 1229 may be associated with multiple position points, each having an FRS, but the highest risk position point for the particular structure may be assigned to the overall parcel since this position point would be the "weakest link" point with regard to the potential flood risk hazard 1130, in this example. By failing to accurately assess the structures/rooftop location, instead using only the centroid to 1221 in this example, would give an inaccurate assessment when attempting to characterize the flood risk to the subject parcel.

Based on the teachings herein, it is possible to collect building footprints as well as at the national level using large multi-parcel maps and/or imagery data. While it is possible, theoretically, to manually digitize the structure geometries for individual parcels at the national level, attempting to do this in practice would almost certainly run into time and budget obstacles. Therefore, identifying another process in which a parcel based building footprint auto extraction methodology may be used based on either aerial photographs or satellite imagery would be valuable. By following this approach a database of structures at the national level may be populated relatively efficiently. It would also allow for greater resolution or granularity with regard to the structures that need to be insured within a particular parcel, as compared to an approach that uses the centroid of the parcel.

Figure 5:
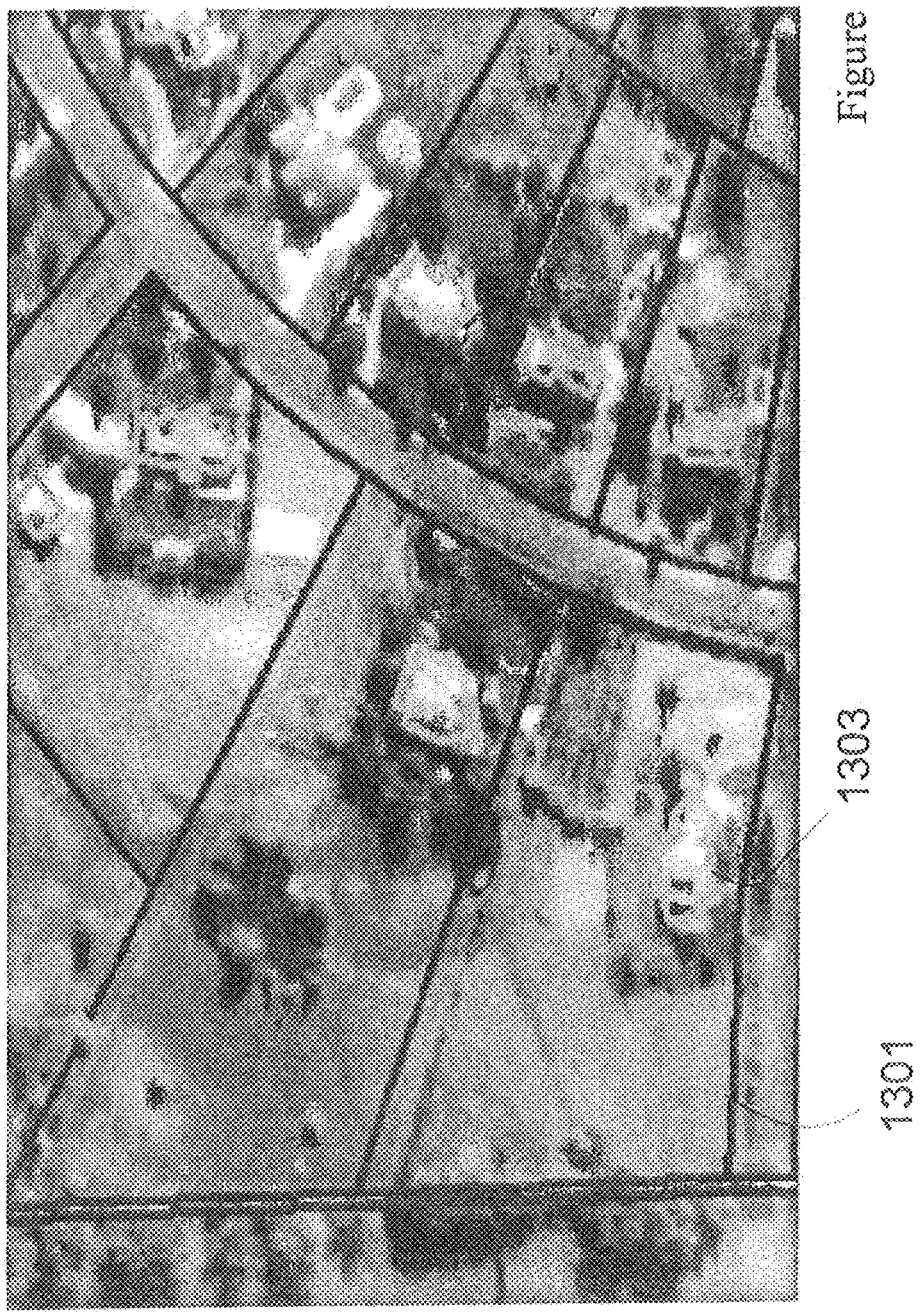
FIG. 5 is an aerial map with parcel boundary geometries overlaid on associated parcels.

One of the advantages for using the parcel boundary geometry for the building footprint extraction is that parcel boundary geometry narrows the unconstrained geospatial surge from landscape scale imagery down to the parcel level. This allows for auto-detection of man-made structures to be possible. One example of this is shown as parcel 1301 in FIG. 5. Here a particular structure 1303 within that parcel may be the house, for which the homeowners seek flood insurance. A second advantage is that the parcel boundary geometry provides a geospatial linkage between the structure and the property information. This is helpful in establishing the relationship between identified objects such as structures and land use, and to integrate property information during the building footprint extraction process.

Turning now to the methodology of the automated building footprint extraction method, it should first be recognized that buildings are constructed with characteristics based on human lifestyle and desire, and typically are therefore different from their background environment such as the earth's surface in terms of colors/tones, shapes, building materials and geospatial relationship to other man-made structures such as roads. The contrast between structures and the surrounding environment is the theoretical basis for developing buildings footprint auto-extraction according to the present embodiment. The geospatial intelligence/methodology for the auto-extraction approach has three primary components: (1) detecting possible man-made structures based on contrast to their surrounding environments on the earth's surface; (2) establishing a relationship and linkage between detected structures and geospatial and land use information entities such as parcels and property information; and (3) applying geospatial intelligence and search logic for extracting the structure footprints.

Figure 12:
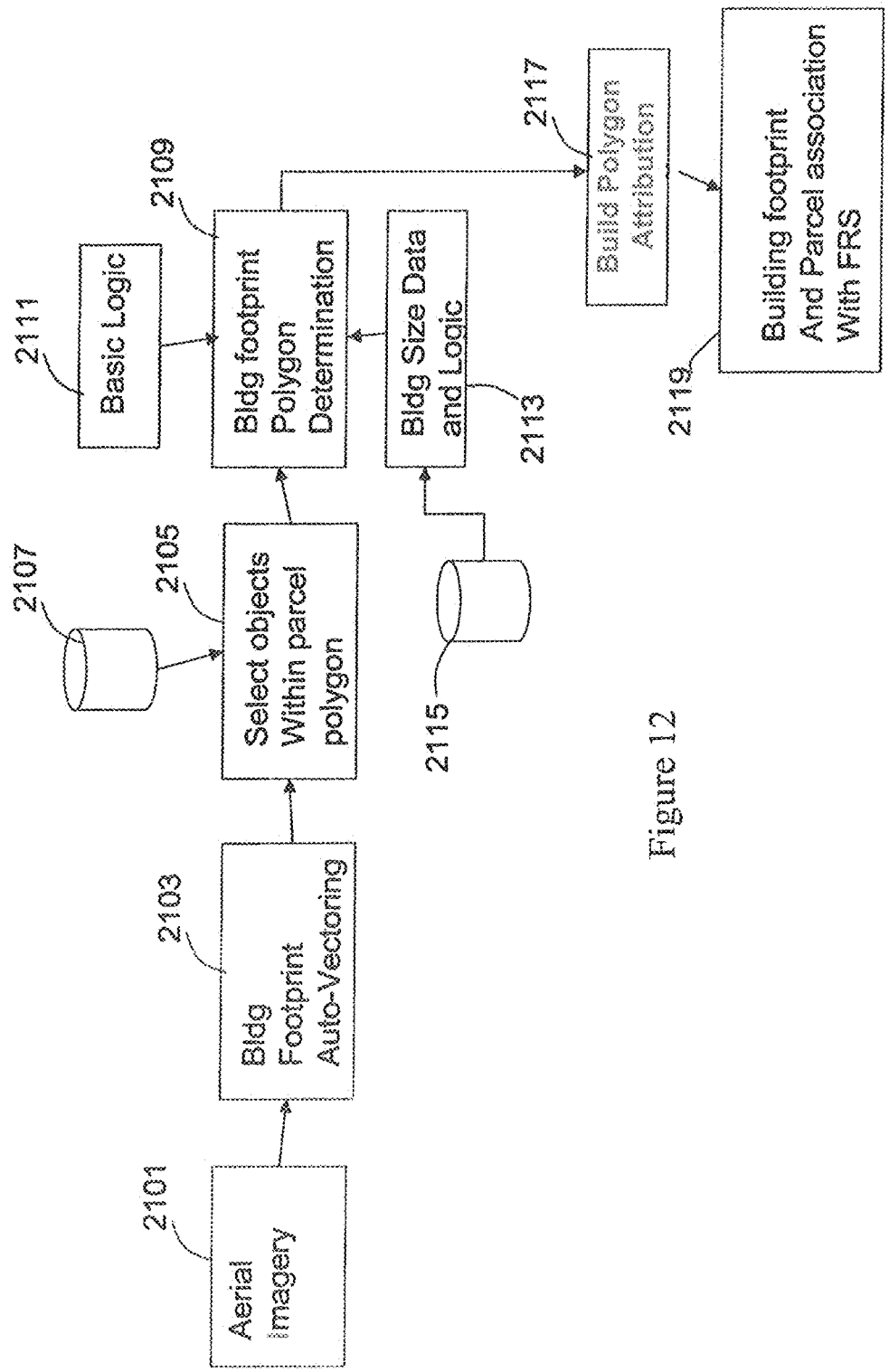
FIG. 12 is a flowchart showing a primary process flow for extracting building footprint images from aerial imagery.

FIG. 12 shows a flowchart of a method for inputting aerial imagery and ultimately forming a database of building footprints associated with particular parcels, each footprint having one or more position points associated therewith for providing a FRS. In particular with regard to FIG. 12, the process begins collecting aerial imagery 2101, which for example may be through exemplary aerial photographs, or from the USGS DOQQ.

Figure 6:
FIG. 6 is an exemplary aerial photo of a community used as an example for describing a structure boundary extraction method according to an embodiment.

FIG. 6 shows an exemplary image using USGS DOQQ aerial photos of a small community in Boston. As seen in the figure, building footprints such as a footprint of building 1401 may generally be viewed visibly by eye.

With respect to FIG. 12, the process proceeds to Step 2103 where the building of footprints and auto vectoring is performed. Here, a definition is made for image contrast threshold to detect boundary/outline of particular buildings. Based on the contrast of the buildings from their surroundings, particularly roof colors, the image threshold can be determined.

Figure 7:
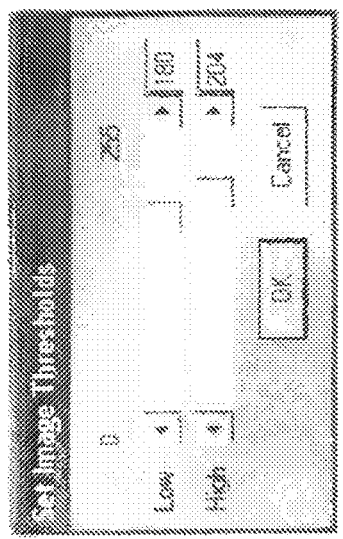
FIG. 7 is a graphical user interface of a controller for adjusting image thresholds of aerial images to assist in extracting boundaries of building structures contained in the aerial images.

FIG. 7 shows an example of a control bar for setting image thresholds of the image data. As shown, a particular range of 180 to 204 is shown for establishing contrast ranges. This range is merely exemplary, and not intended to be limiting. A broader range may be used for collecting more difficult to capture images such as 100 to 255 for example. However, even more selective ranges such as 110 to 240 or 120 to 230, or 130 to 220, etc., in increments, may be used for the particular situation. In an exemplary embodiment, the range of 180 to 204 was used. When image thresholds were adjusted to certain values, the outlines of the building structures can be formed. For complex communities in terms of the type of building construction, multiple thresholds can be defined as discussed above. The thresholds form the parameters used in the structure auto-extraction processing as will be discussed.

In Step 2103, line features are extracted based on the parameters defined above as vector data into a GIS file format (such as ESRI shapefiles).

Figure 8:
FIG. 8 shows image outlines of building structure footprints obtained when after adjusting image thresholds of aerial images containing building structures.
Figure 9:
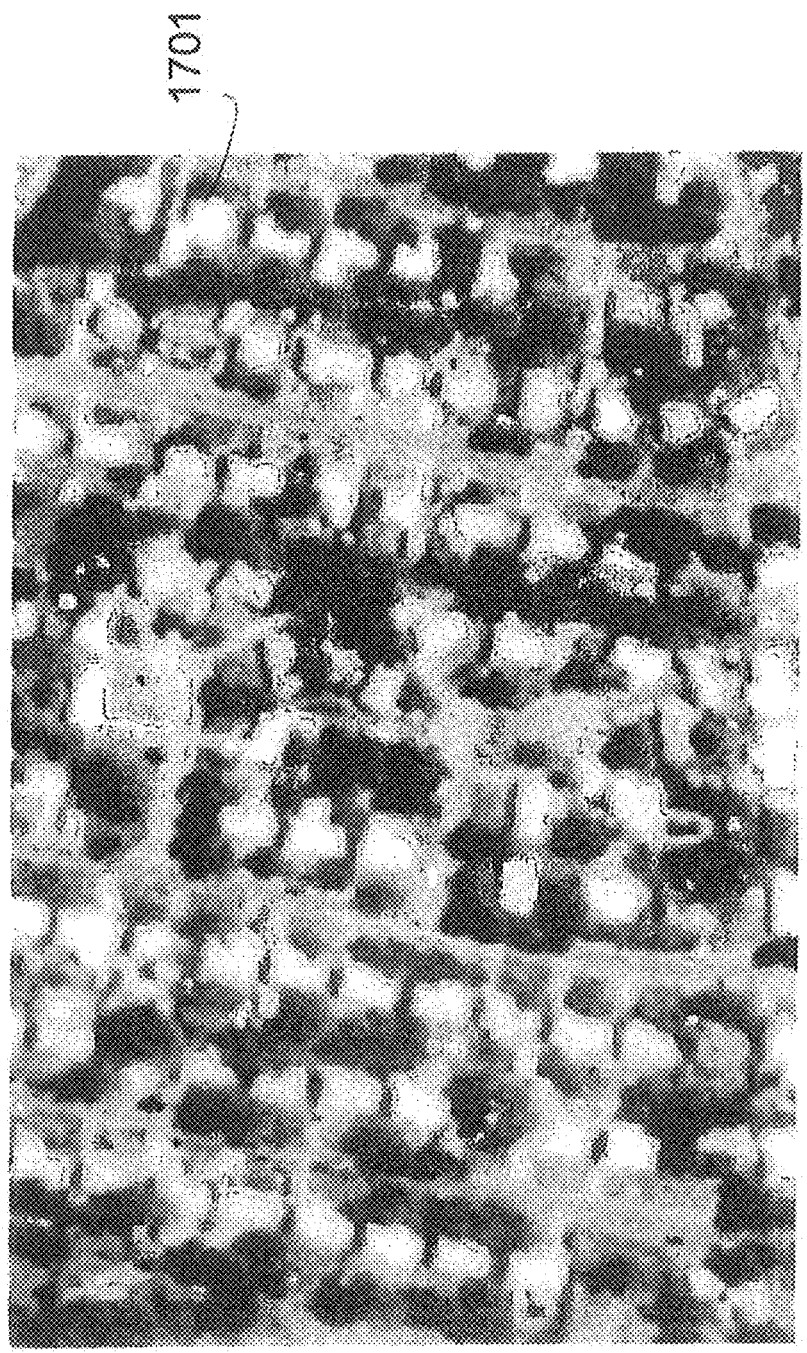
FIG. 9 illustrates line features that can be extracted for building polygons that outline building structure footprints that have been highlighted through the image threshold adjustment process.

FIG. 8 shows, for example, that outlines of the images that may be set by adjusting the different set image thresholds. The outline of a particular building 1601 corresponds with 1401 from FIG. 6. FIG. 9 shows line features that represent possible outlines of building footprints in a targeted area. As demonstrated, the majority of building structures in the area can be identified using this auto-extraction procedure. Shapefiles for vectored features can then be converted into an appropriate projection for the next processing step. Optionally, if multiple thresholds are used, the vectoring process may be repeated multiple times and duplicated features from the different image threshold operations can then be dissolved.

In Step 2105, of FIG. 12, the line features are cleaned and then converted into polygon features based on a given node snapping distance (e.g., 1 foot, although this distance may be set anywhere from one inch to 100 feet, depending on the situation, for example). The nodes of the extracted line features are not generally connected around the structures initially. It should be expected that there is some gaps among these line features. Therefore, associated nodes of the outline features are connected and the topology for the building footprint can later be built.

A number of rules, which may be implemented in logic, such as a software routine, may be applied for convening the data into polygons that accurately represent the building structures on a particular parcel. A summary of these rules follows.

If the property is a residential property and the number of structure polygons in the parcel is greater than one, then the process deletes polygons with sizes that are greater than the upper square foot limit for the residential property (e.g., 20,000 square feet). In some situations the auto-extraction procedure could pick up an extremely large area (such as a huge parking lot) in this situation the logic rule can be used to address this exception.

Figure 10A:
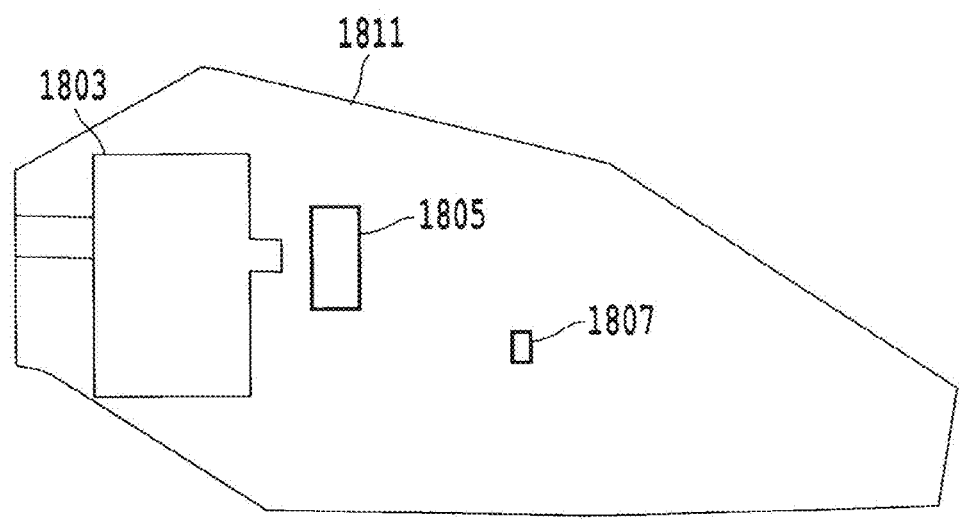
FIGS. 10A and 10B are illustrations to explain a polygon simplification process used to remove extraneous polygons that are not valid candidate building structure footprints.

As shown in FIG. 10A the property may be a commercial property having a building 1805 in the parcel 1811. The parcel may also include a large parking lot area 1803, and perhaps an extraneous polygon 1807 that is an artifact of the imaging process. In this case, the process deletes polygons with sizes greater than the upper square footage limit for the commercial. This would eliminate polygon 1803. Likewise, if the number of structure polygons in the parcel is greater than 1, then the polygon with the size that is closest to the building square footage listed in the property database is kept. In this case polygon 1805 is kept since it is closest to the recorded square footage for the building structure. Polygon 1807 is eliminated as it is smaller. In this case, building dimension information is useful for validating the size of detected objects.

Another rule regarding the establishment of structure polygons is that if the number of polygons in the parcel is greater than 1, then polygons that are dimensionally too narrow to be a livable space may be eliminated. Typically structures less than 15 feet in width could be a sidewalk, driveway or part of a road for example.

Likewise, polygons that are too long typically indicate being a road or a driveway and can thus be eliminated. Also, polygons may be deleted that contain significant areas beyond the parcel boundary. These types of objects could likely be road features, water features, vegetation features or uniform soil features that overlap parcels. If a polygon contains long and skinny parts, then the portion that is long and skinny may be cut off. Once again, long may be measured as a function of a side of a parcel boundary, and skinny may be measured in terms of feet such as 15 feet or less.

Figure 10B:
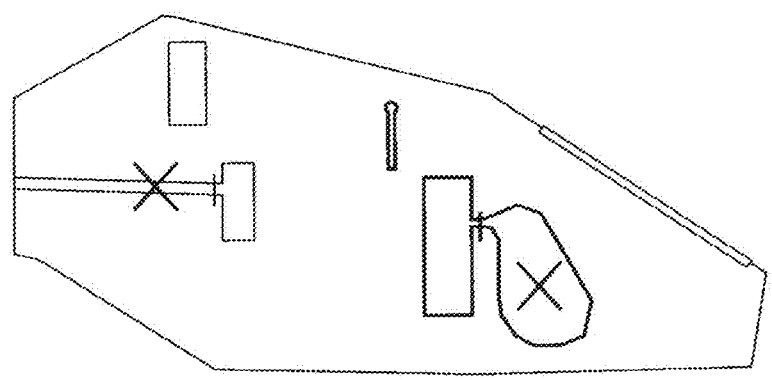

Likewise if the polygon contains a bottleneck shape, the pieces may be cut into two and a polygon with the smallest number of vertexes is kept. FIG. 10B shows graphically the elimination of long and skinny features showing a road, as exemplified by an X through the structure. Also, the irregular structure on the right side of FIG. 10B is shown as being eliminated. This is because this feature appears not to be a man-made object, but rather a natural object within the parcel.

Figure 11:
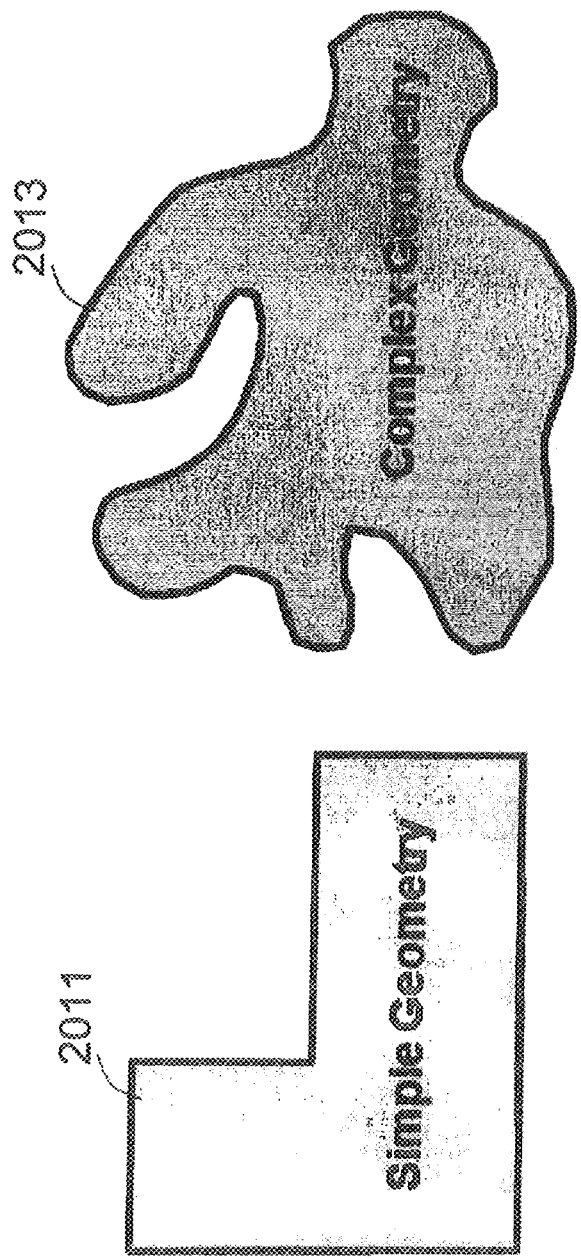
FIG. 11 shows two exemplary geometries, simplex and complex, which may be used in determining legitimate building structures based on polygon shape complexity.

Another rule that may be applied in creating the polygon structures is the keeping of polygons with the simpler geometry. For example, in FIG. 11 a structure 2011 is one that has a simple geometry, as compared to a more complex geometry structure 2013. In comparing these two structures, the simple geometry 2011 has straight lines with right angles, but the complex geometry has an irregular shape and a large number of vertices in its boundaries. Once again typically man-made structures do not have such a complex geometry due to the difficulty and expense of construction and maintenance.

When the number of structure polygons in the parcel is greater than 1, then the polygon located closer to the road may be kept. Most likely, primary structures are the structures constructed in locations that have the easiest access to roads.

In some instances, a particular parcel may have multiple buildings located thereon. In such cases, multiple structure polygons may be stored and associated with that particular parcel. If properties having multiple addresses are to be analyzed, the polygon can be split into multiple polygons based on this simple geometry.

Building footprints obtained from aerial photos sometimes can be partially obscured by trees taller than the structure itself. However, by extending straight lines from lines that have been truncated, allows for the restoration of the intact geometry to be restored.

Often the structure polygons can be extracted from georeferenced tax maps if the tax maps are available. If the scanned tax maps are collected this could also be an option to assist in identifying the polygons for a particular parcel.

In this case, building footprints are often outlined on a tax map and the tax map can be vectorized and geo-referenced for inclusion in the database.

Other options include building the footprints manually digitized from aerial photographs or satellite imagery including on-line map applications and collected for a national building footprint database.

As will be discussed below, building footprints can also be created using GPS waypoints around building structures and collected for inclusion in the database.

In FIG. 12, the parcel database 2107 may provide input into the spatial vectorized select objects within parcel polygon Step 2105 so that the parcel boundary may be distinguished from adjacent parcels. Then as was previously discussed, in the building footprint polygon determination Step 2109, the basic logic rules discussed above (2111) is applied in determining the different polygons, in cooperation with building size databases 2115, and building size and logic 2113, applying the rules discussed above are used in forming the polygons 2109. Subsequently, in Step 2117, the polygon attribution is built for collection in a national database and linked to structure photos as part of the building footprint data content. Optionally the building footprints that are auto-extracted can be verified by comparison with manually digitized building footprints in particular areas. This helps eliminate inaccuracies in the polygon creating process. As will be discussed, auto-extracted building footprints can be verified on a parcel-by-parcel basis, for a limited sample set, using GPS-enabled mobile devices including SmartPhones and tablet computers as will be discussed. The sampling of property locations ensures the quality of the data processing.

When new aerial photos or imagery is available, the auto-extracted building footprint database can be updated using the above-described rules, by comparing different data observed between polygons on particular parcels.

Returning to FIG. 12, after the building footprint polygons are created, building footprint points (roof-top points for example), are developed for inclusion in a building point technology database 2119. The building footprint points provide a revolutionary geospatial data element (rooftop locations) for the geocoding technology, that would significantly increase the locational accuracy of the geocoding technology. With the building footprint enabled geocoding engines, structure/rooftop points can be provided as property geocodes. For flood risk assessment, for example, each of the different footprint points (e.g., roof-top points) may be used in establishing more accurate flood risk scores for the particular points as was previously discussed. In this way, multiple flood risk scores are located for different features of buildings at a particular parcel.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for identifying a building on a parcel of land, comprising:
    accessing aerial imagery data for a predetermined portion of the parcel of land;
    detecting with processing circuitry contained in a mobile processing device a building on the predetermined portion via image processing;
    retrieving over a computer network at the mobile processing device building features stored on a remote database;
    comparing with the processing circuitry features of the detected building with a database of building features known for the building on the predetermined portion of the parcel of land to identify if a mismatch exists;
    in response to no mismatch being identified, storing an indication of a detection of the building on the predetermined portion of land based on the comparison,
    detecting at the mobile processing device specific position points on the predetermined parcel of land that correspond to one or more of physical features of the predetermined parcel of land and/or improvements on the predetermined parcel of land;
    associating each specific position point with a location on the predetermined portion of land;
    calculating a flood risk score for each specific position point based on the location of the specific position point on the predetermined portion of land; and
    setting an insurance quote for the predetermined parcel of land based on the flood risk score for at least one specific position point.

2. A method for identifying a building on a parcel of land, comprising:
    accessing aerial imagery data for a predetermined portion of the parcel of land;
    detecting with processing circuitry contained in a mobile processing device a building on the predetermined portion via image processing;
    retrieving over a computer network at the mobile processing device building features stored on a remote database;
    comparing with the processing circuitry features of the detected building with a database of building features known for the building on the predetermined portion of the parcel of land to identify if a mismatch exists;
    in response to no mismatch being identified, storing an indication of a detection of the building on the predetermined portion of land based on the comparison;
    detecting a building footprint from the aerial imagery data;
    accessing the aerial imagery data corresponding to a predetermined parcel of land;
    extracting a footprint of one or more man-made structures on the predetermined parcel of land via building footprint auto extraction; and
    setting a property insurance quote based on the footprint extracted with the processing circuitry.

3. A method for identifying a location on a predetermined parcel of land, comprising:
    receiving aerial imagery data corresponding to the predetermined parcel of land, the imagery data being received via a mobile processing device;
    recording specific position points on the predetermined parcel of land via the mobile processing device, wherein the specific position points are recorded as the mobile processing device is moved around the predetermined parcel of land; and
    associating each specific position point with a location on the predetermined parcel of land to confirm a correspondence between the specific position points recorded via the mobile device with previously stored position points.

4. The method of claim 3, further comprising:
    detecting at the mobile processing device specific position points on the predetermined parcel of land that correspond to one or more of physical features of the predetermined parcel of land and improvements on the predetermined parcel of land.

5. The method of claim 4, wherein the method further includes
calculating a flood risk score for each specific position point based on the location of the specific position point on the predetermined portion of land, and
setting an insurance quote for the predetermined parcel of land based on the flood risk score for at least one specific position point.

6. The method of claim 3, further comprising:
detecting a building footprint from the aerial imagery data.

7. The method of claim 6, further comprising:
accessing the aerial imagery data corresponding to a predetermined parcel of land;
extracting a footprint of one or more man-made structures on the predetermined parcel of land via building footprint auto extraction; and
setting a property insurance quote based on the footprint extracted with the processing circuitry.

8. A system, comprising:
a mobile processing device, wherein the mobile device includes processing circuitry configured to
access aerial imagery data for a predetermined portion of a parcel of land,
detect a building on the predetermined portion via image processing,
retrieve building features stored on a remote database,
compare features of the detected building with a database of building features known for the building on the predetermined portion of the parcel of land to identify if a mismatch exists,
in response to no mismatch being identified, store an indication of a detection of the building on the predetermined portion of land based on the comparison,
detect at the mobile processing device specific position points on the predetermined parcel of land that correspond to one or more of physical features of the predetermined parcel of land and/or improvements on the predetermined parcel of land, and
associate each specific position point with a location on the predetermined portion of land,
calculate a flood risk score for each specific position point based on the location of the specific position point on the predetermined portion of land, and
set an insurance quote for the predetermined parcel of land based on the flood risk score for at least one specific position point.

9. A system, comprising:
a mobile processing device, wherein the mobile device includes processing circuitry configured to
access aerial imagery data for a predetermined portion of a parcel of land,
detect a building on the predetermined portion via image processing,
retrieve building features stored on a remote database,
compare features of the detected building with a database of building features known for the building on the predetermined portion of the parcel of land to identify if a mismatch exists,
in response to no mismatch being identified, store an indication of a detection of the building on the predetermined portion of land based on the comparison
detect a building footprint from the aerial imagery data,
access the aerial imagery data corresponding to a predetermined parcel of land,
extract a footprint of one or more man-made structures on the predetermined parcel of land via building footprint auto extraction, and
set a property insurance quote based on the extracted footprint.

10. A system, comprising:
a mobile processing device, wherein the mobile processing device includes processing circuitry configured to
receive aerial imagery data corresponding to the predetermined parcel of land,
record specific position points on the predetermined parcel of land, wherein the specific position points are recorded as the mobile processing device is moved around the predetermined parcel of land, and
associate each specific position point with a location on the predetermined parcel of land to confirm a correspondence between the specific position points recorded via the mobile device with previously stored position points.

11. The system of claim 10, wherein the processing circuitry is further configured to
detect at the mobile processing device specific position points on the predetermined parcel of land that correspond to one or more of physical features of the predetermined parcel of land and/or improvements on the predetermined parcel of land.

12. The system of claim 11, wherein the processing circuitry is further configured to
calculate a flood risk score for each specific position point based on the location of the specific position point on the predetermined portion of land, and
set an insurance quote for the predetermined parcel of land based on the flood risk score for at least one specific position point.

13. The system of claim 10, wherein the processing circuitry is further configured to
detect a building footprint from the aerial imagery data.

14. The system of claim 13, wherein the processing circuitry is further configured to
access the aerial imagery data corresponding to a predetermined parcel of land,
extract a footprint of one or more man-made structures on the predetermined parcel of land via building footprint auto extraction, and
set a property insurance quote based on the extracted footprint.

* * * * *